No. 660,222. Patented Oct. 23, 1900.
J. C. PEDEN.
CARBURETING LAMP.
(Application filed Feb. 6, 1900.)
(No Model.) 2 Sheets—Sheet 1.

WITNESSES:
Geo. W. Naylor
C. R. Ferguson

INVENTOR
Joseph C. Peden
BY
Munn
ATTORNEYS

No. 660,222.   
J. C. PEDEN.  
CARBURETING LAMP.  
(Application filed Feb. 6, 1900.)  
Patented Oct. 23, 1900.

(No Model.)

2 Sheets—Sheet 2.

WITNESSES:

INVENTOR  
Joseph C. Peden  
BY  
ATTORNEYS

UNITED STATES PATENT OFFICE.

JOSEPH CLARK PEDEN, OF NEW ALBANY, INDIANA, ASSIGNOR TO THE ALADDIN INCANDESCENT GAS LAMP COMPANY, OF SAME PLACE.

CARBURETING-LAMP.

SPECIFICATION forming part of Letters Patent No. 660,222, dated October 23, 1900.

Application filed February 6, 1900. Serial No. 4,175. (No model.)

*To all whom it may concern:*

Be it known that I, JOSEPH CLARK PEDEN, a citizen of the United States, and a resident of New Albany, in the county of Floyd and State of Indiana, have invented a new and Improved Carbureting-Lamp, of which the following is a full, clear, and exact description.

This invention relates to improvements in carbureting-lamps; and the object is to provide a lamp of simple construction and so arranged that there will be a uniform pressure of gas, thus resulting in an even flame.

I will describe a carbureting-lamp embodying my invention and then point out the novel features in the appended claims.

Reference is to be had to the accompanying drawings, forming a part of this specification, in which similar characters of reference indicate corresponding parts in both views.

Figure 1:
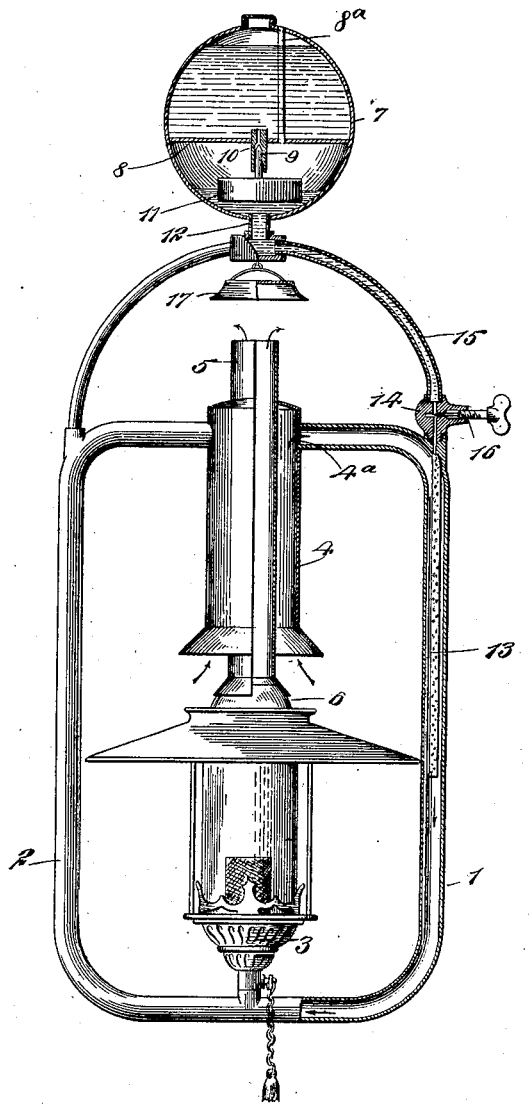
Figure 2:
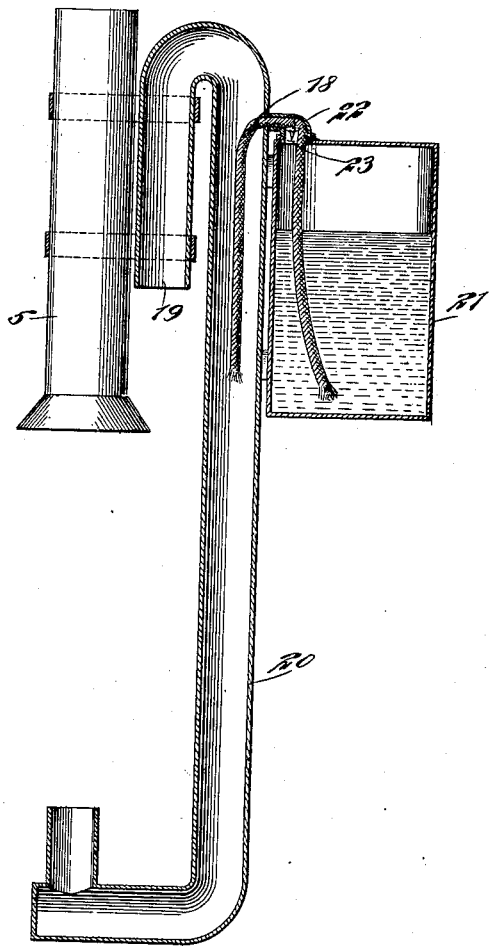

Figure 1 is a partial elevation and partial section of a lamp embodying my invention, and Fig. 2 is a sectional elevation showing a modification.

The frame of the lamp, as shown in Fig. 1, consists of the side portions 1 and 2, one of which is made tubular to form a vapor-pipe. It is obvious, however, that both may be made tubular if it is desired to vaporize the gasolene at both sides, and it is also obvious that the side tube 2 may be omitted, if desired. The vapor-pipe 1 communicates with a burner 3 at its lower end, and at its upper end it communicates with an air-drum 4, surrounding a heating-tube 5, which extends through said drum and is adapted to slide therein, so that it may be raised from its engagement with a lamp-chimney 6 when it is desired to remove the chimney or place one on the burner. Between the tube 1 and the drum 4 a screen $4^a$ is placed, which breaks the air-current and prevents flickering of the flame.

The gasolene-holder 7 is divided by means of a transverse partition 8 into an upper and a lower chamber, the upper chamber being designed to contain the main body of gasolene, while the lower chamber is designed to receive from the upper chamber a certain amount of gasolene to maintain practically a uniform amount of gasolene in the lower chamber, thus providing for a uniform pressure, forcing the gasolene to the vapor-tube and the vaporized material to the burner. The lower chamber has an air-inlet tube $8^a$, and as a means for controlling the flow of liquid from the upper chamber to the lower chamber I employ a pin-valve 9, operating in a valve-casing 10, which projects through the partition 8 and extends slightly above the same, so that sediment will be prevented from passing into the upper open end of the casing, the sediment settling around the valve-casing in the upper chamber. The valve 9 is connected to a float 11, so that as the liquid passes into the lower chamber the float will be gradually raised to close the valve until the gasolene in the lower chamber shall again become lowered.

A pipe or nipple 12 extends into the lower chamber of the gasolene-holder and projects slightly above the inner surface thereof, so as to prevent the entrance of sediment to said tube or nipple.

Arranged within the vapor-pipe 1 is a spreader 13, consisting of a tube closed at its lower end and provided through its wall with a number of fine perforations. This spreader communicates through a valve-casing 14 with a tube 15, which leads to a connection with the tube or nipple 12, and in the valve-casing 14 a needle-valve 16 is arranged to operate. A bell 17 is supported above the tube 5, serving not only as a smoke-bell, but to prevent heat from reaching the gasolene-holder.

In operation when the gas issuing from the burner is ignited and the valve 16 is open the heat passing through the pipe 5 will heat the air drawn through the drum 4, so that it reaches the gasolene issuing from the small perforations in the spreader, thus forming a gas, which is drawn by the flame to the burner. The gasolene passing through the small perforations in the spreader will run down on the outer side of the same around the whole circumference of the spreader. Therefore the whole amount of gasolene will be reached and mingled with the heated air.

It will be seen that the feed of gasolene is automatically controlled, so that after once igniting the gas in the burner no further attention need be paid to it.

The device is very simple in its construction, and therefore not liable to get out of order.

Instead of the tubular perforated spreader shown in Fig. 1 I may employ a wire so connected to the valve that the gasolene will run down its surface, or I may employ a wicking or similar material 18, as shown in Fig. 2. In this modification an air-heating drum 19 is connected to and arranged at one side of the heating-tube 5 and is, in fact, a portion of the vapor-pipe 20, to which a gasolene-tank 21 is attached. The distributer 18 passes into the vapor-pipe through a tube 22 and may be adjusted by a star-wheel 23. In this construction the oil will be carried through the wicking, and when it is desired to extinguish the light the star-wheel is to be turned until the wicking is removed from the vapor-pipe.

Having thus described my invention, I claim as new and desire to secure by Letters Patent—

1. A carbureting-lamp, comprising a burner, a vapor-pipe having communication with the burner, a heating-tube arranged above the burner and supported on the burner-chimney, an air-drum for receiving heat from the heating-tube and having communication with the vapor-pipe, a spreader extended downward in the vapor-pipe, and means for supplying gasolene to the spreader, substantially as specified.

2. A carbureting-lamp, comprising a burner, a vapor-pipe having communication with the burner, a heating-tube arranged above the burner and supported on the burner-chimney, an air-drum surrounding the heating-tube and in which the heating-tube is movable vertically, the said drum having communication with the vapor-pipe, a spreader in the vapor-pipe, and means for supplying gasolene to the spreader, substantially as specified.

3. A carbureting-lamp, comprising a burner, a vapor-pipe having communication with the burner, a heating-drum having communication with said pipe, a spreader, and means for moving said spreader into and out of the vapor-pipe, substantially as specified.

4. In a carbureting-lamp, a gasolene-container having upper and lower chambers, a valve-casing extended through the partition dividing said chambers, the said tube being extended above and below the partition, a valve operating in the valve-casing, a float connected to the valve, a pipe or nipple extended through the bottom of the lower chamber, and slightly above the wall thereof, a tube leading from said nipple, a vapor-pipe with which said tube communicates, a valve in said tube, and means for supplying air to the vapor-pipe, substantially as specified.

In testimony whereof I have signed my name to this specification in the presence of two subscribing witnesses.

JOSEPH CLARK PEDEN.

Witnesses:
HENRY E. JEWETT,
WILLIAM O. VANCE.